United States Patent [19]

Farr

[11] Patent Number: 4,669,788

[45] Date of Patent: Jun. 2, 1987

[54] VEHICLE WITH LOAD CONSCIOUS BRAKE PRESSURE REDUCING VALVE

[75] Inventor: Glyn P. R. Farr, Leek Wootton, United Kingdom

[73] Assignee: Lucas Industries Public Limited Company, Birmingham, England

[21] Appl. No.: 760,727

[22] PCT Filed: Dec. 4, 1984

[86] PCT No.: PCT/GB84/00418

§ 371 Date: Jul. 18, 1985

§ 102(e) Date: Jul. 18, 1985

[87] PCT Pub. No.: WO85/02589

PCT Pub. Date: Jun. 20, 1985

[30] Foreign Application Priority Data

Dec. 8, 1983 [GB] United Kingdom ............... 8332767

[51] Int. Cl.$^4$ .............................................. B60T 8/22
[52] U.S. Cl. ................................. 303/6 C; 303/22 R
[58] Field of Search ................ 303/6 C, 22 R, 84 R

[56] References Cited

U.S. PATENT DOCUMENTS 3,503,657  5/1970  MacDuff ........................ 303/22 R
3,866,984  2/1975  Seip ............................... 303/22 R
3,901,561  8/1975  Seip ............................... 303/22 R
3,909,074  9/1975  Seip ............................... 303/22 R
4,411,476 10/1983  Koshimizu ..................... 303/6 C

FOREIGN PATENT DOCUMENTS 1469619 1/1967 France .
2087494 5/1982 United Kingdom .

Primary Examiner—Duane A. Reger
Attorney, Agent, or Firm—Scrivener and Clarke

[57]  ABSTRACT

A vehicle comprising sprung and unsprung parts is provided with a brake pressure reducing valve (10) controlled by a position sensing spring which applies to the control piston (12) a force (S) determined by the relative position of the sprung and unsprung parts. The sensing spring force (S) tends to move the control piston (12) in the direction to open the valve, and is opposed by an internal bias spring (18) which tends to close the valve. By suitable choice of piston areas $A_1$ and $A_2$ and spring forces increase (above cut-in pressure) in input pressure ($P_1$) will always produce an increase in output pressure ($P_2$) despite the reduction in sensing spring force (S) which will occur due to weight transfer.

7 Claims, 5 Drawing Figures

VEHICLE WITH LOAD CONSCIOUS BRAKE PRESSURE REDUCING VALVE

This invention relates to a vehicle having at least one load conscious valve for controlling the brake pressure applied to the rear brakes of the vehicle.

It is well known to provide a vehicle with one or more brake pressure reducing valves which operate, under certain conditions, to provide a brake pressure to the rear brakes which is lower than the pressure applied to the front brakes. Such pressure reducing valves may be made load conscious whereby the characteristics of the valve are varied in accordance with both static and dynamic loading of the vehicle. Vehicle loading may be sensed by incorporating the valve as a load bearing component in a suspension assembly which interconnects the sprung and unsprung parts of the vehicle, whereby the whole or a significant part of the load transmitted from the sprung to the unsprung parts of the vehicles is applied to the valve. Such an arrangement is shown in GB No. 1557006A. In the alternative, the valve may be separate from the suspension and may be provided with a sensing spring which applies to the valve a force determined by the relative position of the sprung and unsprung parts of the vehicle. It is with this type of valve that the present invention is concerned. Since the relative position of the sprung and unsprung parts is dependent on vehicle loading, such an arrangement does render the valve load conscious. However, no significant part of the vehicle load is transferred from the sprung to the unsprung part of the vehicle by the valve since the sensing spring is light and only serves to sense the position of the unsprung part relative to the sprung part. A prior art arrangement of this general type is shown in GB No. 1252700A.

While valves of the non-load bearing type have various advantages which will be known to those skilled in the art, prior art valves of this type have suffered from a disadvantage, described in more detail below, whereby under contain operating conditions the pressure applied to the rear brakes is considerably less than optimum. The present invention provides a vehicle having a valve of this general type with substantially improved performance in this respect.

According to the present invention there is provided a vehicle comprising a sprung part supported on a plurality of unsprung parts by way of a plurality of suspension assemblies; at least one brake pressure reducing valve having an inlet connected to a source of hydraulic brake fluid, an outlet connected to a rear brake operating cylinder, and a control piston which moves in a first direction to interrupt communication between the inlet and the outlet; a bias spring which applies to the control piston a substantiallY constant force tending to move the control piston in the said first direction; and a positioning sensing spring which at all times when the vehicle is in use applies to the control piston a force in opposition to that of the bias spring, the force applied by the position sensing spring being determined by the relative position of the sprung and unsprung parts of the vehicle.

In the preferred embodiment of the invention the force applied by the position sensing spring is determined by the relative position of the vehicle body and the rear axle or a rear unsprung suspension arm. The force applied to the control piston by the sensing spring increases as the sprung and unsprung parts move nearer to each other, as will occur when load is added to the vehicle, and decreases when, due to weight transfer during braking, the sprung and unsprung parts move away from each other.

The invention will be better understood from the following description of the prior art and of a preferred embodiment of the invention, reference being had to the accompanying drawings, wherein.

Figure 1:
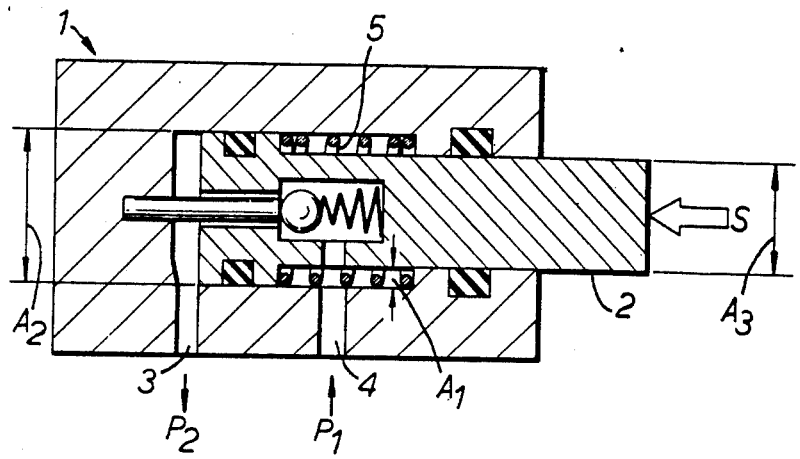
FIG. 1 shows schematically a typical prior art valve.

Referring firstly to FIG. 1 there is shown schematically a typical prior art brake pressure reducing valve 1 of the type employing an axle position sensing spring separate from the vehicle suspension. In use the valve is, for example, mounted on the vehicle body and is connected to the rear axle by a positioning sensing spring which applies to the control piston 2 a force S dependent on the relative position of the rear axle and body. As the rear axle and body move towards each other with increased vehicle loading the force S increases. The sensing spring is set such that when the vehicle is stationary and carrying only the driver the force S is small and is substantially zero at the cut-in pressure of the va)ve 1 (the pressure at which the valve 1 will begin to provide a lower pressure at the outlet 3 than the pressure at the inlet 4). Thus the cut-in pressure under driver only conditions is determined by the equation:

$$P_c A_3 = K$$

where:
$P_c$ = cut-in pressure
$A_3$ = area of the rod of piston 2
$K$ = the force of spring 5

Figure 2:
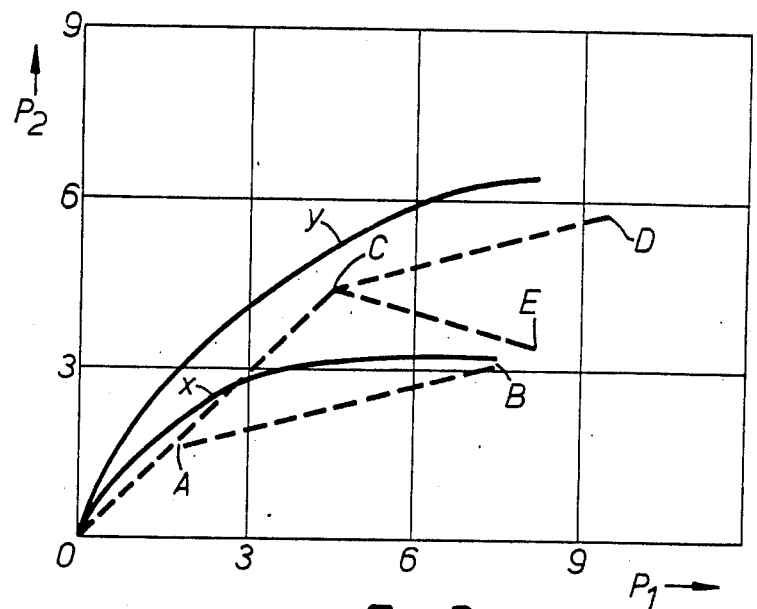
FIG. 2 is a graph showing the characteristics of the valve of FIG. 1.

For driver only conditions the general equilibrium equation of the valve lat pressure above cut-in is:

$$P_1 A_1 + K = P_2 A_2$$

where:
$P_1$ = pressure at inlet 4
$P_2$ = pressure at outlet 3
$A_2$ = area of the piston head
$A_1 = A_2 - A_3$ Thus, for driver only the cut-in pressure is determined solely by the spring 5 and the rise in outlet pressure at pressures above cut-in is determined mainly by the area ratio ($A_1/A_2$), weight transfer having no effect on the rise in outlet pressure. The overall driver only characteristics of the valve are given by the line OAB of FIG. 2 and gives a reasonable approximation to the computed ideal driver only characteristic curve X of FIG. 2.

When the vehicle is laden the position sensing spring will apply a foroe S to the control piston and the cut-in pressure is given by:

$$P_c A_3 = K + S$$

Accordingly cut-in pressure is dependent on vehicle loading, as required. At pressures above cut-in:

$$P_1A_1 + S + K = P_2A_2$$

where: S is the force of the sensing spring which reduces with weight transfer.

It has previously been thought that, for any given vehicle loading, the rate of reduction in (S+K) due to weight transfer is substantially less than the rate of increase in $P_1A_1$ and above cut-in the rise in outlet pressure will again be determined mainly by the ratio $A_1/A_2$. Thus, the predicted characteristics of the valve of FIG. 1 when the vehicle is fully laden are given by the line OCD plotted on FIG. 2, i.e. it was thought that effect of loading the vehicle was to increase the cut-in pressure (from A to C), but to leave substantially unaltered the rate of rise of outlet pressure at pressures above cut-in (line CD parallel to line AB). The line OCD gives a good fit to the computed ideal fully laden characteristic line Y.

However, it has now been found upon more detailed analysis of vehicle dynamic characteristics that the reduction in factor (S+K) is not insignificant as had previously been thought, but rather the factor (S+K) reduces significantly during braking due to weight transfer to the front of the vehicle. This has an adverse effect on the ratio of input to output pressure and results, under extreme conditions, in the phenomenon that a rise in $P_1$ produces a smaller rise in the factor $P_1A_1$ than the resultant decrease in the factor S. Thus, a rise in $P_1$ produces a fall in $P_2$. This characteristic is represented by the line OCE of FIG. 2 and compares unfavourably with the computed ideal fully laden characteristic Y. The practical effect of this is severe under utilisation of the rear brakes resulting in un-necessarily long stopping distance on good road surfaces.

Figure 3:
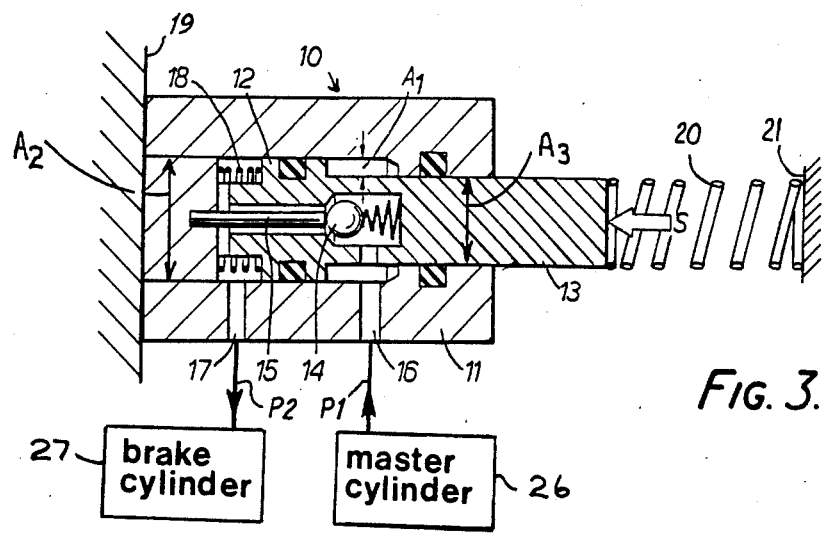
FIG. 3 shows schematically a valve for use in an embodiment of the invention.
Figure 5:
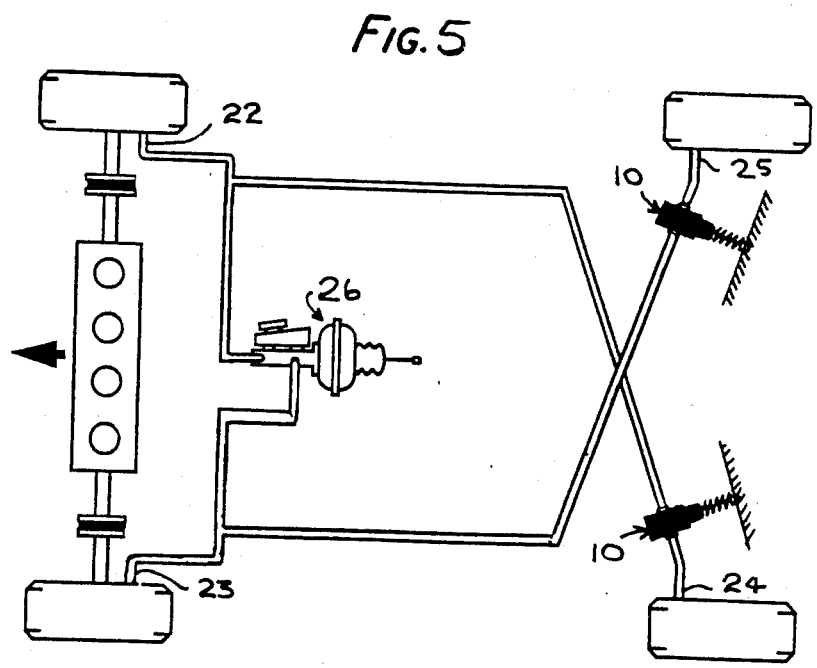
FIG. 5 is a schematic view of a X-split brake system incorporating two valves as shown in FIG. 3.

Referring now to FIG. 3 the valve 10 comprises a body 11 which is fixed to the sprung part 19 of a vehicle and which houses a control piston 12 carried by a piston rod 13. The piston rod 13 is acted upon by a position sensing spring 20 which reacts against a sprung part 21 of the vehicle. The piston 12 houses a valve 14 which is normally held open by a pin 15 secured to the valve body 11 to provide communication between a master cylinder 26 connected to inlet 16 and a brake cylinder 27 connected to outlet 17. The valve 14 closes as the piston 12 moves to the right, and thereby interrupts communication between the inlet 16 and outlet 17. An internal bias spring 18 applies a substantially constant force K' to the piston tending to close the valve 14. The bias spring 18 acts in opposition to the position sensing spring, but the position sensing spring is designed and set so that it always applies to the control piston a force S which is greater than the substantially constant force K' of the bias spring 18. Cut-in pressure $P_c$ is given by $$P_cA_3 = S - K'$$

The sensing spring is set such that under driver only conditions the correct cut-in pressure is obtained. The sensing spring characteristics are selected so that the desired progressive increase in cut-in pressure is obtained with progressive increase in vehicle loading.

Above cut-in pressure, the valve of FIG. 3 satisfies the following equation for both driver only and laden conditions:

$$P_2A_2 = P_1A_1 + S - K'$$

Since it is appreciated that the factor (S−K') will not be constant but will decrease with increasing brake pressure due to weight transfer effects, the area ratio $A_1/A_2$ is selected such that, upon an increase in brake input pressure, the factor $P_1A_1$ will always increase more than S−K' will decrease. Thus, an increase in $P_1$ will always produce an increase in $P_2$, despite weight transfer effects.

Figure 4:
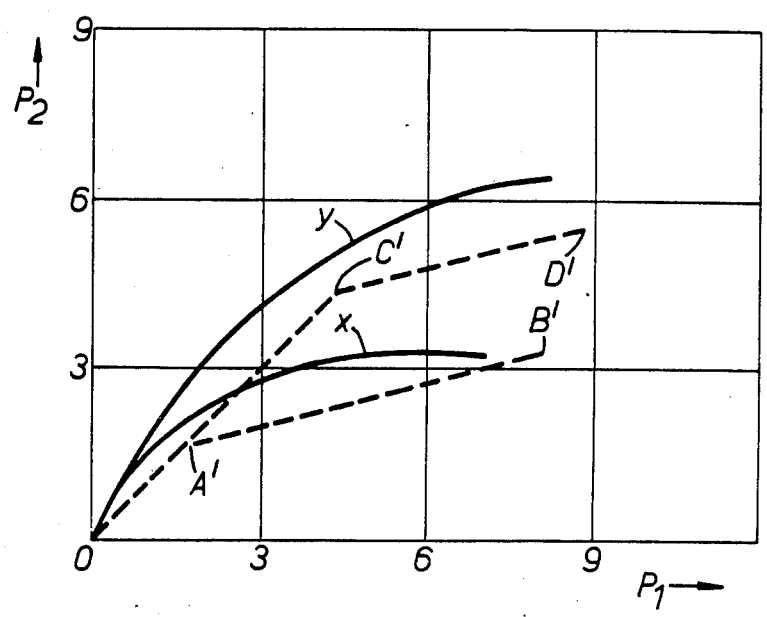
FIG. 4 is a graph showing characteristics of the valve of FIG. 3.

The driver only characteristics OA'B' and fully laden characteristics OC'D' of the valve of FIG. 3 are plotted in FIG. 4. It will be appreciated that the line OC'D' of FIG. 4 provides a much better approximation to the ideal curve Y than does the line OCE of FIG. 2, and that this is achieved without sacrificing the driver only characteristics.

While the above described valve is of general utility, it is particularly useful in an X split system (a system in which each front brake is linked to the diametrically opposed rear brake) which incorporates anti-lock controls on the front brakes only. In such a system, an impending front wheel lock will result in automatic relief of brake pressure in the front wheel in question and in the diametrically opposed rear wheel. When the brake pressure is reapplied, the cut-in point of the reduction valve associated with the rear wheel in question will be lower than upon initial application because of weight transfer caused by the other brakes. If the valve of FIG. 1 is used, there will be little or no increase in output pressure after cut-in, and indeed there may be a decrease. If the valve of FIG. 3 is used, however, the output pressure will rise rapidly after cut-in due to the high ratio of $A_1/A_2$ coupled with the relatively small additional weight transfer which will occur under these conditions.

It will be appreciated that in the above described arrangement according to the invention the valve provides a variable output in accordance with weight transfer effects even in the case of driver only loading. This is in contrast to the prior art in which output was determined solely by the geometry of the valve in the driver only case and, in addition to enabling better rear brake utilisation in the case of straight line braking, offers significantly better braking on cornering in the driver only case when two valves are employed as part of an X-split system. This is because the two valves associated with the X-split system will be located adjacent the respective rear wheels and will thus detect the transverse weight transfer which occurs during cornering. The effect will be to prevent locking of the more lightly laden (inner) rear wheel and to provide better utilisation of the more heavily laden (outer) rear wheel, even in the driver only case.

An advantage of the reducing valve of the present invention is that, should the position sensing springs fails, the bias spring 18 moves the piston 12 to maintain it in a position in which communication between the inlet and the outlet is interrupted until applied inlet pressure rises to a predetermined value, and is operative, when the inlet pressure is higher than the predetermined value to provide a pressure at the outlet which is smaller than the pressure at the inlet.

I claim:

1. A vehicle comprising: a sprung part supported on a plurality of unsprung parts by way of a plurality of suspension assemblies; at least one brake pressure reducing valve having an inlet connected to a source of hydraulic brake fluid, an outlet connected to a rear brake operating cylinder, and a control piston which moves in a first direction to interrupt communication between the inlet and the outlet; an external position sensing spring which applies to the control piston at all times when the vehicle is in use a force which is determined by the relative position of the sprung and unsprung parts of the vehicle; and a bias spring which applies to the control piston a substantially constant force which tends to move the control piston in the first direction and which opposes the force applied to the control piston by the position sensing spring, the bias spring being operative in the event of failure of the external spring to maintain the control piston in a position in which communication between the inlet and the outlet is interrupted until the inlet pressure rises to a predetermined value, and being operative when the inlet pressure is higher than the predetermined value to provide a pressure at the outlet which is smaller than the pressure at the inlet.

2. A vehicle according to claim 1 wherein a closure member of the control valve is housed within the control piston and the flow path from the inlet to the outlet is via a passage formed in the control piston.

3. A vehicle according to claim 2 wherein the closure member is spring biased towards its closed position by a closure member spring and is normally held open by a pin which extends through the passage formed in the control piston to engage the body of the brake pressure reducing valve.

4. A vehicle according to claim 3 wherein the cut-in pressure of the brake pressure reducing valve (10) is given by the formula:

$$P_c A_3 = S - K$$

where:
- $P_c$ = cut-in pressure
- $A_3$ = area of the piston rod of the control piston
- $K$ = force applied to the control piston by the bias spring
- $S$ = force applied to the control piston by the position sensing spring.

5. A vehicle according to claim 4 wherein at pressures above cut-in pressure ($P_c$), the outlet pressure is given by the formula:

$$P_2 A_2 = P_1 A_1 + S - K$$

where:
- $P_2$ = outlet pressure
- $P_1$ = inlet pressure
- $A_1$ = area of control piston exposed to inlet pressure
- $A_2$ = area of control piston exposed to outlet pressure.

6. A vehicle according to any preceding claim wherein the bias spring is located within the body of the brake pressure reducing valve, and acts directly on the valve body and the control piston.

7. A vehicle according to any of claim 1 through 5 wherein the vehicle is equipped with an X-split braking system and a separate brake pressure reducing valve is associated with each circuit of the X-split system, each brake pressure reducing valve being located adjacent a respective rear wheel of the vehicle.

* * * * *